Dec. 4, 1956
B. G. MARTIN ET AL
2,773,236
APPARATUS FOR DETECTING INGRESS AND
EGRESS OF FLUID IN A BOREHOLE
Filed June 3, 1953
2 Sheets-Sheet 1
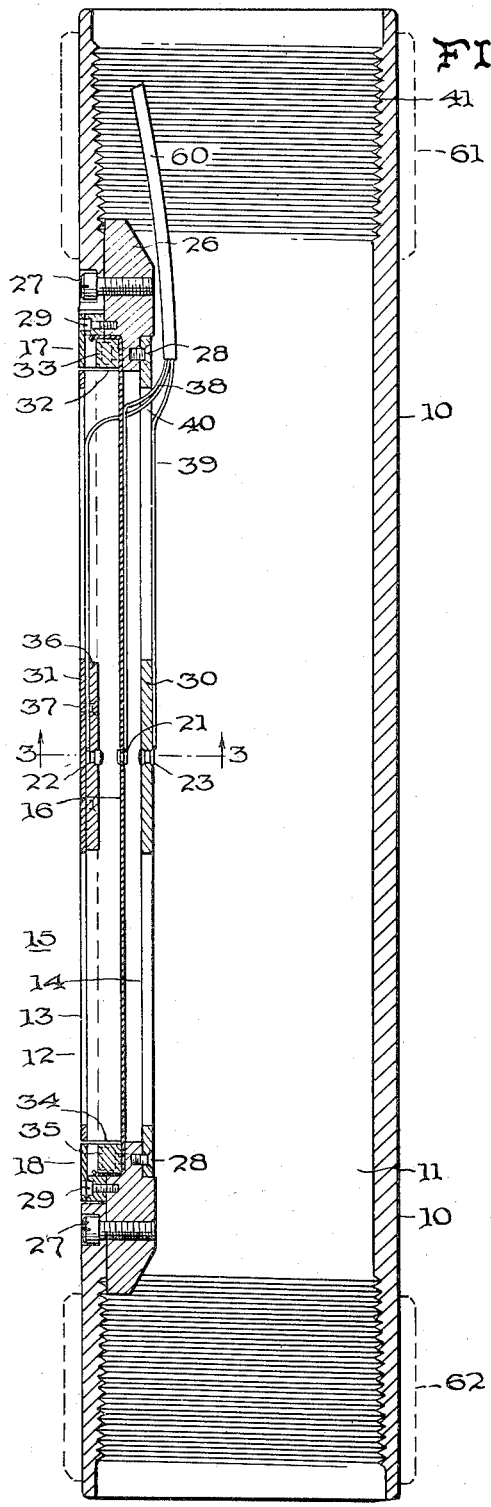
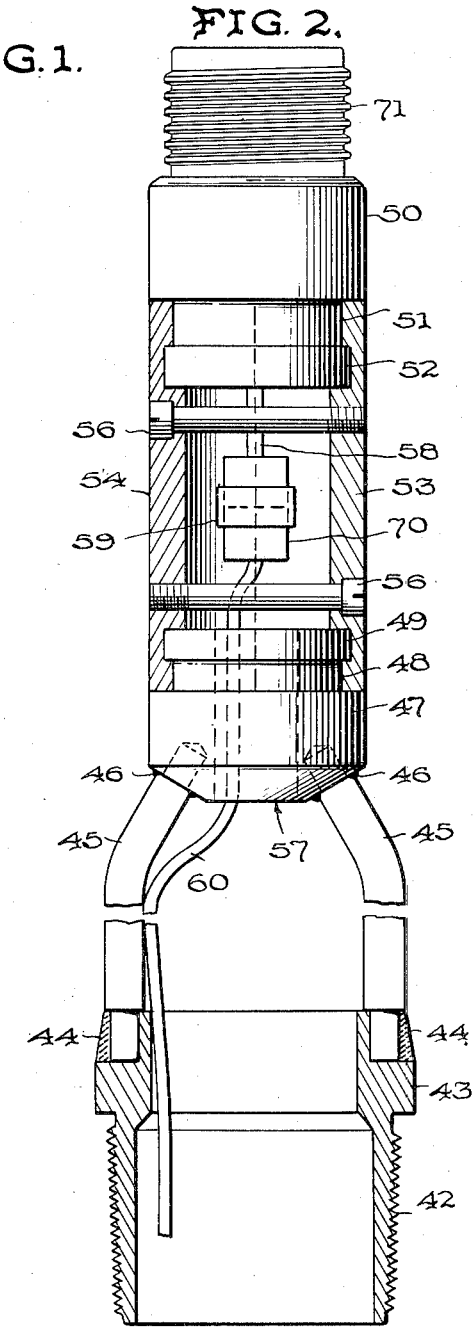
INVENTORS
B. G. MARTIN
R. D. WYCKOFF
BY
Horace H Cooke
ATTORNEY Dec. 4, 1956
B. G. MARTIN ET AL
2,773,236
APPARATUS FOR DETECTING INGRESS AND
EGRESS OF FLUID IN A BOREHOLE
Filed June 3, 1953
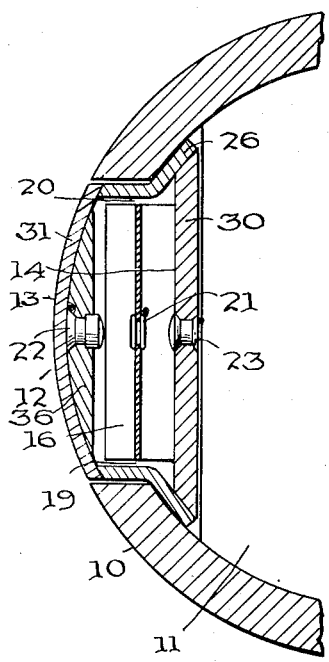
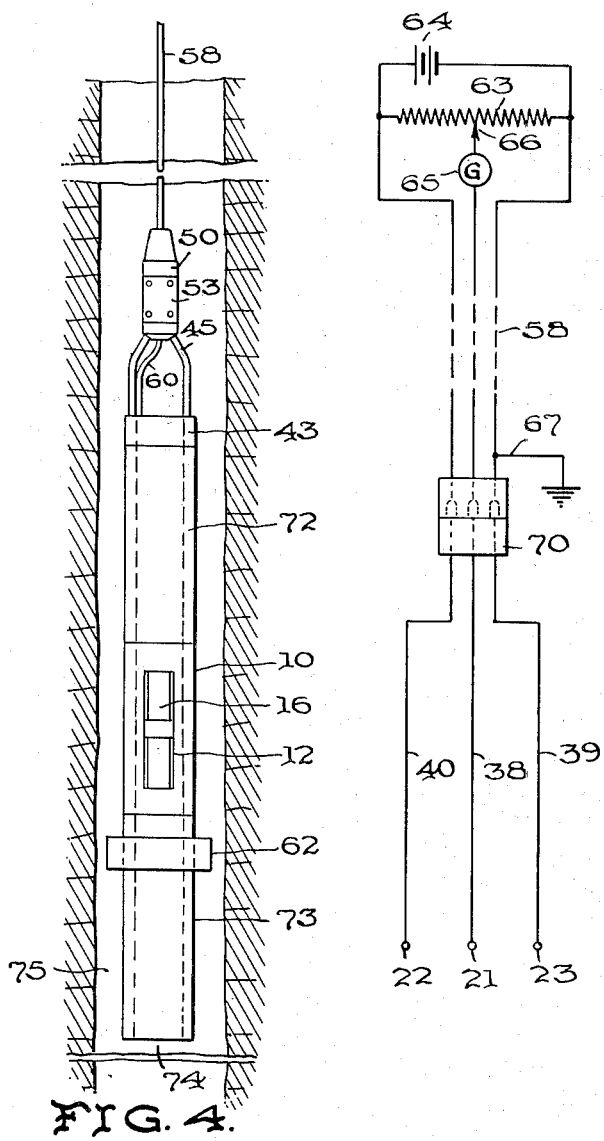
INVENTORS
B. G. MARTIN
R. D. WYCKOFF
BY
Horace Cooke
ATTORNEY United States Patent Office 2,773,236
Patented Dec. 4, 1956

2,773,236

APPARATUS FOR DETECTING INGRESS AND EGRESS OF FLUID IN A BOREHOLE

B. G. Martin, Houston, Tex., and Ralph D. Wyckoff, Pittsburgh, Pa., assignors, by direct and mesne assignments, to Gulf Research & Development Company, Pittsburgh, Pa., a corporation of Delaware Application June 3, 1953, Serial No. 359,358

5 Claims. (Cl. 324—2)

This invention relates to the measurement of fluid-motion irregularities in a borehole. More particularly, it relates to the detection of zones of ingress or egress of fluid in a borehole and especially the detection of fluid motion in a radial direction to or from the borehole.

This invention is adapted to detect in a borehole such fluid-flow irregularities as zones of lost circulation, thief zones, casing leaks, zones of fluid entry into the borehole, etc. This invention may be employed when such irregularities occur while drilling the borehole, or in a well after it is put on production, and it may also be used to determine the distribution of fluid pumped into a borehole e. g. for salt-water disposal, water-injection in secondary recovery operations, etc. While oil and gas wells are mentioned, the problem of determining the radial flow distribution throughout the depth of a well is also often encountered in water wells. This invention may be advantageously employed for measuring the flow rate of any fluid which has an appreciable degree of electrical conductivity.

Methods heretofore described in the prior art include the use of electrolytes in well fluids to electrically detect water entry zones, fluid-flow measuring devices containing meters which are actuated by fluid flow and employ vibrations which are transmitted to the surface as electrical impulses, temperature surveys employed in certain prescribed manner, and others. However, the heretofore known methods of detecting fluid-flow irregularities are dependent on one or more well-fluid characteristics and the heretofore known apparatus is easily fouled by sealing materials and loose shale. The present invention is characterized by its great simplicity and its complete independence of changes in the well-fluid characteristics and therefore is not limited in its detection of zones of lost circulation and fluid entry by dependence on well-fluid characteristics.

Accordingly, it is an object of this invention to provide a method of detecting regions of fluid motion irregularities by electrical means.

Another object of this invention is to provide a method of detecting regions of lost circulation and fluid entry into or out of a borehole.

A further object of this invention is to provide a method of detecting fluid motion irregularities by utilizing the well fluid as a conducting medium in an electric circuit.

Still another object of this invention is to provide an apparatus for detecting the radial component of well-fluid motion.

A still further object of this invention is to provide a detecting apparatus for determining regions of fluid motion irregularities in a borehole.

The foregoing objects together with additional objects are attained as will be more fully apparent to persons skilled in the art by reference to the following description and annexed drawings which pertain to a preferred embodiment of our invention, and wherein:

Figure 1 is a longitudinal cross-sectional view of the main apparatus assembly;

Figure 2 is a longitudinal sectional view of an electrical connection plug adaptor to which the apparatus of Figure 1 is attached;

Figure 3 is a horizontal cross-sectional view of the main apparatus assembly taken on line 3—3;

Figure 4 is a longitudinal section of part of a borehole showing the assembled apparatus suspended in the hole; and Figure 5 is a schematic wiring diagram of the apparatus showing the electrical connection of the three electrodes to the plug adaptor and to the indicating circuit at the surface.

Briefly, the present invention comprises a method and apparatus for detecting fluid motion irregularities in a borehole wherein said fluid motion irregularities are caused by radial flow of fluids such as water into or out of the borehole. The method comprises the use of a radial pressure-gradient detector which employs the borehole fluid as an electrically-conducting medium to form an electrical circuit wherein fluid motion disturbances are transmitted as electrical indications to an indicating means at the surface of the well and electrically connected with the detecting means in the borehole through a conventional cable adapted to lower the apparatus of this invention to known depths into the borehole. The method of this invention, to be described more fully hereinafter, operates independently of changes in conductivity of the well fluid and can be used to detect any fluid motion disturbance throughout the borehole as long as there is fluid in the borehole capable of being used as an electrically-conducting medium.

Referring now to Figures 1 and 3 of the drawings, an open-ended cylinder 10 of substantially uniform inside bore 11 is provided with an opening or window 12 in one side of the cylinder. The window carries a frame 26 having a rectangular opening of any convenient shape, but preferably somewhat longer in the vertical direction and with substantially parallel sides. The frame 26 may be fastened to the cylinder 10 by means of screws 27. The frame 26 in turn carries on its exterior and interior faces, respectively, frames 13 and 14 which are made of electrically-insulating material and fastened to the frame 26 by means of screws 28 and 29. The frame 14 has integral therewith a horizontal member 30 and is opened over a substantial part of its face. The frame 13 carries integral therewith a horizontal member 31 and is also open over a substantial part of its face, the openings in frames 13 and 14 being substantially in register. It is apparent that the openings in frames 13 and 14 permit easy access of the well fluid either into the cylinder bore 11 from the outside, or from the interior of the cylinder through the window and then to the formation outside of the cylinder.

A detector is placed in the window to measure the tendency of the fluid to flow in either direction by responding to the pressure gradient across the window. The detector comprises a relatively long strip of elastic membrane 16 which is anchored at the top 17 by means of a clamping strip 32 and screws 33, and at the bottom by means of a corresponding clamping strip 34 and screws 35. The side edges of the membrane 16 are not anchored and may clear the sides 19 and 20 of the window by a small space, for instance, a small fraction of an inch. The elastic membrane 16 may be of rubber or any other suitable electrically non-conducting elastomer which is preferably oil-resistant and adapted to permit deflection of the membrane whenever small pressure gradients exist across the window. Alternatively, the membrane may be of a relatively stiff material which is elastically mounted at one end. The small leakage of fluid through the clearances 19 and 20 on the sides of the membrane produces substantially no loss of sensitivity of the membrane (since, in any event, fluid flow into or out of the formation must occur to be detectable) and the fact that the membrane is not clamped at its sides very substantially increases the sensitivity of the membrane over that attainable with a membrane clamped around its entire periphery. This preferred embodiment of our invention provides a very sensitive element, the stiffness of which may be adjusted by varying the amount of stretch given to the elastomer before clamping its ends. Thus, the amount and direction of the deflection of the membrane 16 from its normal position is a measure of the magnitude and direction of the pressure gradient across the window.

In order to detect and measure the deflection of the elastic membrane 16 caused by the pressure gradients across the window, the well fluid is employed in our invention as an electrically-conducting medium to form a potentiometric circuit. To this end a conducting button 21, made of lead or any other material having suitable non-polarizing electrode properties, is fastened in a small perforation at substantially the center of the membrane 16, the button 21 being exposed on both sides of the membrane 16. A similar electrode 23 is fastened on the horizontal member 30 of frame 14, and a further similar electrode 22 is mounted on the horizontal member 31 of frame 13. In order to permit of easy assembly, it has been found convenient to mount the electrode 22 on a separate insulating plate 36 which is in turn held on the member 31 by means of screws 37.

A small flexible insulated conductor wire 38 is connected, as by soldering, to the button 21 and may be cemented or otherwise attached to the surface of the membrane 16 as far as a point near the upper end of the diaphragm 16. A similar insulated wire 39 is connected to the electrode 23 and may be fastened in any convenient manner to be supported by the insulating frame 14. Similarly, an insulated wire 40 is connected to the electrode 22 and may be supported by the frame 13. The wires 38, 39 and 40 thus form insulated electrical leads to the respective electrodes 21, 23 and 22. These leads may be cabled together or joined to a three-conductor cable 60 and pass upward to apparatus on the surface of the ground as explained later.

When the apparatus is placed in a well full of electrically-conducting fluid, the well fluid between the electrodes 21 and 23 and that between the electrodes 21 and 22 form two electrical resistances whose magnitudes vary in inverse manner as the membrane 16 moves in or out of the window in response to fluid flow in these respective directions. Furthermore, since the same ambient fluid exists on both sides of membrane 16 the ratio of the two resistances varies only in response to motion of the membrane 16 carrying the electrode 21, this ratio being substantially independent of the resistivity of the ambient fluid. This will be utilized in the indicating circuit as explained later.

The cylinder 10 is provided at its upper end with internal threads 41 so that it may be secured to the external threads 42, shown on the lower end of Figure 2. The purpose of the arrangement shown in Figure 2 is to provide a convenient means for connecting the apparatus of Figure 1 to an available well-logging cable. The lower end of Figure 2 has a short annular member 43 provided with the external threads 42 and has welded, as at 44, or otherwise fastened to its upper end, a number of rods 45, preferably three or more in number, so arranged as to form an open grid or cage through which fluid may easily pass from the interior of the cylinder 10 to the exterior of the apparatus. The rods 45 are welded as at 46 or otherwise fastened to a hollow cylindrical member 47. The member 47 has a reduced diameter 48, which diameter is again enlarged as at 49.

The upper portion of Figure 2, as at 50, is representative of the type of device which is commonly used at the lower end of well-logging cables available in the field. The device 50 also has a reduced diameter, as at 51, and an enlargement 52. The two members 47 and 50 are then conveniently mechanically connected together by means of two semi-cylindrical split sleeves 53 and 54, having on their concave surfaces recesses conforming to the diameters 48, 49, 51 and 52. Thus, by mating the two semi-cylindrical sleeves 53 and 54 on the respective members 47 and 50, the latter two members may be mechanically joined. The sleeves 53 and 54 are held together by means of screws 56 so that the entire assembly of Figure 2 affords a rigid connection between the members 47 and 50. The member 47 is bored with a central opening 57 through which the cable 60 (comprising the wires 38, 39 and 40) may pass to one-half of a separable connector plug 70, the other half of which is normally available at the lower end of a commercial well-logging cable. The well-logging cable 58 extends upward through the strain element 50 to the surface of the ground, and the entire unit may be raised or lowered to known position in the well either by means of the cable or by means of pipe screwed on at 71. The joint between the two halves of the separable connector plug 70 may be sealed by means of a sleeve 59, or any other conventional means to prevent the entrance of well fluids. The element 50 is shown with male threads 71 at its upper end, but other conventional arrangements may be used to position the apparatus in the well, and this element per se does not form a part of our invention.

The wires 38, 39 and 40 may be connected to connector 70 either singly or through an intermediate cable 60 to whose conductors they may be spliced with the splices sealed against the entrance of well fluids in conventional manner. Either the wires singly or the cable 60 may be supported by one of the rods 45 in order to afford mechanical protection as it passes upward.

Figure 4 shows the apparatus suspended in a borehole. It is contemplated that a section of pipe 72 similar in size to the pipe 10 and having a male thread at one end and a female thread at the other may be interposed between cylinder 10 of Figure 1 and element 43 of Figure 2. It is further contemplated that in particular a section of tail pipe 73 similar in size to the pipe 10 be connected to the lower end of pipe 10, in order to extend pipe 10 a substantial distance below the window 12. The tail pipe 73 serves to augment flow through the window 12 and also serves to add weight. If desired it may be of considerably longer length than either the cylinder 10 or pipe 72.

It thus becomes apparent from the above description that well fluid may flow from the bottom of the assembly 74 through the internal bore and out between the rods 45. Fluid may also flow upwardly or downwardly around the outside of the unit and it is apparent that if no fluid is leaving or entering the well in the vicinity of the window 12 there will be no tendency to deflect the membrane 16 either inwardly or outwardly through the window 12. However, should flow exist in a radial direction there will be developed a pressure gradient through the window 12 and the membrane 16 will be deflected slightly either inwardly or outwardly, depending on whether the radial flow is inward to the well or outward from the well.

The sensitivity of the device may further be improved by placing an elastic annular baffle or sleeve, such as 61 or 62 on the outside of the pipe 10 or on its extension 72 or 73 above or below the window so as to seal either partially or substantially completely the pipe 10 or its extensions against the walls of the borehole. The purpose of a baffle such as 62, for example, is to at least partially seal the pipe 10 against the wall of the borehole so as to restrict flow down through the tube 10 and its extension 73 then around the end 74 and upward through the annular space 75 between tube 10 and the borehole wall and into the formation leak, thus by-passing the flow channel through the window. It is apparent that the pressure differential across the window 12 (which produces the deflection of membrane 16) is a direct function of the effective flow resistance existing from one side of the window through the pipe 10, around its end and through the outer annular space 75 to the other side of the window. This flow resistance can be increased by using either one of the baffles 61 or 62, or both. If the borehole is only slightly larger in diameter than the pipe 10, the flow resistance in the annular space round pipe 10 will be high and only short pipe extensions 72 above and 73 below pipe 10 are needed. However, for boreholes of larger diameter, it is advantageous to employ longer extensions 72 or 73 in order to increase the by-pass resistance. If the borehole is very much larger than pipe 10, then it becomes further advantageous to use one or both of the baffles 61 and 62. While the baffles 61 and 62 are shown as annular sleeves, they may be flexible rubber washers mounted on the pipe 10 by means of flanges (not shown) or other means well known in the art. Any means which will have the effect of tending to induce any radial flow present to flow through the window will raise the sensitivity of the apparatus. It is apparent that either or both of the baffles 61 or 62 may be employed for the purpose of diverting flow into the flow channel provided by the window 12.

Alternatively our invention may be used to measure substantially the total flow in the well, by causing substantially all of the flow to pass through the window 12. For this purpose the bottom end of the pipe 10 (or 74) may be plugged so that all flow through the tube 10 will flow through the window 12. Thus by plugging the bottom of pipe 10 or its extension 74, and employing a baffle 61 around the upper end of pipe 10 or its extension 72, it is possible to direct substantially all of the well flow through the window. The baffle must not, of course, form a complete seal, else the device could not be lowered and raised in the fluid-filled hole, but the baffle may form a partial constriction in the space around pipe 10. It is evident that with this arrangement measurements can be taken only when the device is at rest, but such an arrangement is useful, for example, in locating a zone of lost circulation. In this case mud is fed to the borehole only during the short time required for an observation, and the total mud loss during the testing procedure is thereby kept to a minimum. The leak may be located by a successive process of halving depths at which observations are taken. Thus in a 10,000 foot hole, one observation at 5,000 feet will tell which half of the hole involves the leak, whereupon this is again halved, and so on until the leak is localized. This is a rapidly-converging process and is more economical of mud than attempting to survey the entire hole with the device moving in the hole.

The electrical circuit to which the electrodes 21, 22 and 23 are connected is shown in Figure 5. The electrodes are connected via the wires 38, 39 and 40 through the plug 70 to a circuit at the surface indicated at the top of Figure 5. The cable 58 is understood to pass over a conventional calibrated sheave or other measuring mechanism which thereby indicates the depth of the electrodes in the well. The outer electrodes 22 and 23 are connected, respectively, to the ends of a potentiometer 63 which is supplied with electrical current from a source 64. The source 64 may be either a direct-current battery, commutated D. C., or an alternating-current generator, these being of appropriate voltage to provide the desired sensitivity, say 10 to 50 volts. The circuit from electrode 21 passes through a high impedance galvanometer 65 and thence to adjustable contact 66 on potentiometer 63. If alternating current is used, a vacuum-tube type of A. C. galvanometer having the required impedance may be used at 65. Most well-logging cables have provision for grounding one conductor and it is convenient to ground the circuit of the inner electrode 23, as shown at 67. This ground is usually provided in the connector 70. It is thus seen that the source 64 supplies power to a bridge circuit, two arms of which are the two portions of resistor 63, and the other two arms of which comprise the conducting fluid between electrodes 22 and 21, and that between 21 and 23. The bridge may be balanced by adjusting the slider 66 on the potentiometer 63 when the cylinder 10 is at some point of the well where no radial flow is known to exist; for example, inside a section of good casing. If the apparatus in the well is then moved to a portion of the well where radial flow exists, the resulting movement of membrane 16 and its affixed electrode 21 will unbalance the bridge causing deflection of galvanometer 65 in an appropriate direction to indicate the degree of unbalance which will reflect the motion of the membrane and the amount and direction of radial flow.

It is understood that galvanometer 65 may be of a conventional recording type used in well-logging and in which the recording medium is moved in proportion to the amount of cable 58 in the well. The record of galvanometer 65 thus indicates movement of the well fluid at various depths in the well. By using a high-impedance galvanometer 65, the sensitivity of the apparatus is made substantially independent of the well-fluid conductivity.

The resistance of the potentiometer 63 may be chosen so that it is approximately equal to or somewhat less than the resistance of the well fluid in the region of the electrodes. By doing so, the sensitivity of the apparatus is maintained at a satisfactory value without wasting an excessive amount of current in the potentiometer 63. It is apparent that mere changes in conductivity of the electrically-conducting well fluid without radial flow will not unbalance the bridge circuit of Figure 5. Inasmuch as the well fluid may flow past the membrane 16 through the side spaces 19 and 20, there is at all times substantial equality of the electrical properties of the fluid between the various electrodes. However, the properties of the well fluid may vary throughout the depth of the well due to temperature changes or other factors and such change in conductivity does not affect or unbalance the bridge circuit of Figure 5.

While the movable electrode 21 has been indicated as connected to the galvanometer 65, it is apparent that other circuit connections may be employed, since a change in any configuration of the electrodes will change the character of the potential distribution in the electric-current field employed and will therefore affect the potential of any electrode used to detect potential changes. Alternatively, one of the current electrodes may be removed substantially to infinity without affecting the manner of operation of our invention.

In the embodiment shown in the drawings, the potential electrode 21 is substantially midway between similar stationary electrodes 22 and 23, such an arrangement providing a relatively linear indication for small deflections of the membrane 16. By proper design of the size, shape, and disposition of the electrodes and their insulating supports 30 and 31, the linearization may be improved for large deflections. Alternatively, if desired, a non-linear indication may be obtained by disposing one of the stationary electrodes closer to the potential electrode 21 than is the other stationary electrode. Such an arrangement makes the sensitivity asymmetrical, being higher when the movable potential electrode moves from its undeflected position toward the nearer stationary electrode, and lower when the potential electrode moves from its undeflected position toward the more remote stationary electrode. In this manner a different average sensitivity and range of flow indication may be attained for flow through the window in one direction than in the opposite direction.

Although the apparatus of our invention has been described with reference to a particular embodiment and with reference to the use of a commercially-available well-survey truck, it is understood that the entire apparatus may be made integral without interposing the cable connector 70 and the element 50. In this event, mechanical connection may be made directly from the cable to the element 47. If there is pressure on the well, the cable 58 may pass through a lubricator and stuffing box at the top of the well in conventional manner. Furthermore, if it is desired to make a survey of the well wall to locate the azimuthal direction of the radial flow, the apparatus of Figures 1 and 2 may be affixed by means of threads 71 to a pipe which is surveyed into the well whereby the azimuthal orientation of the window 12, as well as its depth, is known at all times.

In operation, the apparatus of our invention is lowered into the borehole to locate regions where there is suspect of fluid being lost to the formation or entry of fluid from the formation. If fluid is being pumped into the hole, as for example in a salt-water disposal well, there will be a steady flow of the fluid with respect to the apparatus in the well, either due to motion of the apparatus in the hole or due to fluid flowing in the hole or both, and there will be very little pressure differential across the inside and outside walls of the apparatus and hence an inappreciable transfer of fluid through the window. However, if there should happen to be a zone where fluid is being lost to the formation, the constant flow of the well fluid is disturbed and as a result there will be radial pressure gradients created at that point. These areas of fluid motion disturbance will induce a component of a radial flow toward the wall of the formation. When the cylinder reaches the point of fluid motion disturbance discussed above, the flexible membrane will deflect in proportion to the horizontal component of pressure gradient across the window. Since a constant potential difference is maintained across the fixed electrodes 22 and 23, the potential on the membrane electrode 21 is a direct function of the position of the membrane 16 carrying this electrode with respect to the fixed electrodes. The electrical indications are transmitted to a surface recording means through a conventional cable used in lowering the instrument so that the depth of the zone of the fluid motion disturbance may be ascertained by the amount of cable paid out into the borehole.

Our invention may be used either to survey a hole while continuously pumping fluid from the surface or while the well is discharging fluid at the surface at a known rate. In such a survey, the apparatus is either dropped down or pulled upward to traverse in a known manner the regions of the hole to be surveyed, motion of the device being either maintained sufficiently slow as to be negligible or the motion of the apparatus with respect to the flowing fluid being accounted for in interpreting the resulting record. Our invention may also be used to survey a hole by stopping it at known check points in the well, then effecting flow, either by pumping fluid into the well at the surface or by flowing the well, and repeating this process until the zone of ingress or egress is located. By using baffles 61 and 62 in the latter method of operation, it is possible to localize the zone of radial flow as accurately as desired.

From the description given above of our method and apparatus for detecting fluid motion disturbances in a borehole, it may be seen that one of the advantages of our invention over the prior art is the practicability and convenience of using the borehole fluid as a conducting medium to form a potentiometric circuit. This advantage is further enhanced by the fact that the electrical indications obtained at the surface are independent of the changes in conductivity of the well fluid. Furthermore, the apparatus described is mechanically sturdy, self-cleaning, it is simple and easy to construct, and is capable of detecting very small pressure gradients caused by changes in rate of flow occurring in the borehole fluid.

From the foregoing it is seen that the present invention has been described in relation to a preferred embodiment of the apparatus. We clearly intend to cover any changes resorted to which do not depart from the spirit of the invention as set forth in the appended claims.

What we claim as our invention is:

1. Apparatus for detecting irregularities of fluid flow in a borehole containing an electrically-conducting fluid which comprises flow-carrying means adapted to be inserted in the borehole and having a flow channel arranged to transmit at least a part of the fluid flow in the borehole, movable means interposed in said flow channel arranged to be deflected by flow through said channel, a first electrode on said movable means, a second electrode fixedly mounted on said flow-carrying means spaced on one side of said first electrode in the line of movement thereof, a third electrode fixedly mounted on said flow-carrying means spaced on the other side of said first electrode in the line of movement thereof, circuit means including an electrical source for passing an electric current through the fluid via said second and third electrodes, and potential-difference detecting means connected with said circuit means and with said first electrode.

2. Apparatus for measuring flow rate of an electrically-conducting fluid which comprises flow-carrying means having a flow channel arranged to transmit at least a part of the fluid flow, movable means interposed in said flow channel arranged to be deflected by flow through said channel, a first electrode immersed in the flowing fluid and mounted on said movable means, a second electrode immersed in the flowing fluid and fixedly mounted on said flow-carrying means and spaced on one side of said first electrode in the line of movement thereof, an electrical conductor contacting the fluid, an electric circuit including means for establishing a difference of potential between two points of said circuit, means electrically connecting one of said circuit points to said conductor, means electrically connecting the other of said circuit points to one of said electrodes whereby an electric current will flow through the fluid, and potential-difference detecting means responsive to the potential difference between the other of said electrodes and a point of said circuit whose potential change as a result of motion of said movable means is different from the potential change of said other electrode as a result of the same motion of said movable means.

3. Apparatus for measuring flow rate of an electrically-conducting fluid which comprises flow-carrying means having a flow channel arranged to transmit at least a part of the fluid flow, movable means interposed in said flow channel arranged to be deflected by flow through said channel, a first electrode immersed in the flowing fluid and mounted on said movable means, a second electrode immersed in the flowing fluid and fixedly mounted on said flow-carrying means and spaced on one side of said first electrode in the line of movement thereof, a source of electric current, a conductor contacting the fluid, two impedances, potential-difference detecting means, a four-terminal electric bridge circuit comprising means connecting one of said impedances between bridge terminals one and two, means connecting the other of said impedances between bridge terminals two and three, means connecting one of said electrodes to bridge terminal one, means connecting said conductor to bridge terminal three, means connecting the other of said electrodes to bridge terminal four, whereby the flowing fluid forms part of the bridge arm between terminals one and four and the flowing fluid forms part of the bridge arm between terminals three and four, means connecting said current source between a pair of opposite bridge terminals, and means connecting said potential-difference detecting means between the other pair of opposite bridge terminals.

4. Apparatus for detecting irregularities of fluid flow in a borehole containing fluid which comprises a tubular flow pipe adapted to be suspended in the borehole, an opening in the side of said flow pipe, an elastic diaphragm suspended in said opening and fastened at both ends partially obstructing fluid flow through said opening and permitting fluid flow through said opening and adapted to be deflected and stretched by fluid flow through said opening, and electrical motion-detecting means fixedly mounted on said flow pipe and engaging said diaphragm between the points of suspension of said diaphragm and adapted to detect deflection of said diaphragm.

5. Apparatus for measuring flow rate of an electrically-conducting fluid which comprises flow-carrying means having a flow channel arranged to transmit at least a part of the fluid flow, an elastic diaphragm suspended in said flow channel partially obstructing fluid flow through said flow channel and permitting fluid flow through said flow channel and adapted to be deflected and stretched by fluid flow through said channel, a first electrode immersed in the flowing fluid and mounted on said diaphragm, a second electrode immersed in the flowing fluid and fixedly mounted on said flow channel and spaced on one side of said first electrode in the line of movement thereof, an electrical conductor contacting the fluid, electric circuit means for establishing a difference of potential between said conductor and one of said electrodes whereby an electric current will flow through the fluid, and potential-difference detecting means responsive to the potential difference between the other of said electrodes and a point of said circuit means whose potential change as a result of motion of said diaphragm is different from the potential change of said other electrode as a result of the same motion of said diaphragm.

References Cited in the file of this patent

UNITED STATES PATENTS

| | | |
|---|---|---|
| 1,440,778 | Foster | Jan. 2, 1923 |
| 1,437,919 | Elliott | May 12, 1925 |
| 2,032,383 | Vromm | Mar. 3, 1938 |
| 2,202,404 | Sease | May 28, 1940 |
| 2,580,182 | Morgan et al. | Dec. 25, 1951 |
| 2,596,437 | Rohrback et al. | May 13, 1952 |

FOREIGN PATENTS

| | | |
|---|---|---|
| 304,890 | Germany | May 26, 1916 |